United States Patent Office 3,483,182
Patented Dec. 9, 1969

3,483,182
LOWER ALKOXYPHENYLAZO - 1 - PHENYL-3-CARBOXY-5-PYRAZOLONE DYES CONTAINING SUBSTITUTED ON THE ALKOXYPHENYL GROUP THE SULFURIC ACID ESTER OF A β-HYDROXYETHYL SULFONE GROUP
Hiroshi Sugiyama, Ashiya-shi, Masakazu Yamamoto, Takarazuka-shi, and Hideo Otsuka, Ibaraki-shi, Japan, assignors to Sumitomo Chemical Company, Ltd., Osaka, Japan, a corporation of Japan
No Drawing. Filed Nov. 14, 1966, Ser. No. 593,717
Claims priority, application Japan, Nov. 15, 1965, 40/70,424, 40/70,425
Int. Cl. C09b 29/38; D06p 3/60
U.S. Cl. 260—163        12 Claims

ABSTRACT OF THE DISCLOSURE

Monoazo dyes represented by the formula,

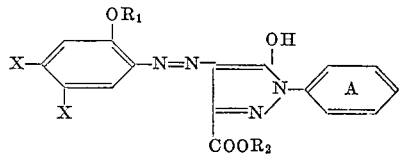

wherein $R_1$ stands for methyl or ethyl group, $R_2$ stands for hydrogen atom, methyl or ethyl, and one of X stands for $-SO_2CH_2CH_2OSO_3H$ and another X stands for hydrogen atom, methyl, methoxy or ethoxy, and the ring A means sulfophenyl or sulfophenyl substituted with methyl, chlorine or methyl and chlorine. These new dyes are particularly suitable for print- or pad-dyeing of natural or regenerated cellulose fibers in a brilliant reddish yellow tint with good fastness to light and to wet processing.

---

This invention provides valuable novel yellow monoazo dyes represented by the general formula:

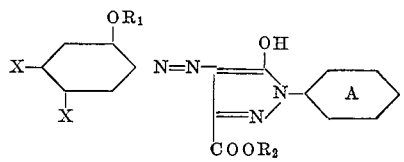

wherein $R_1$ stands for a methyl or ethyl group, and $R_2$ stands for a hydrogen atom, methyl or ethyl group, and one of X stands for a group represented by $$-SO_2CH_2CH_2OSO_3H$$

and another X stands for a hydrogen atom, methyl, methoxy or ethoxy group and ring A is sulfophenyl or sulfophenyl substituted by alkyl, halo or alkylyl and halo acid group and may further contain alkyl groups and/or halogen atoms.

The invention also provides a process for the manufacture of the aforesaid novel monoazo dyes, which comprises contacting a diazotized amine of the formula:

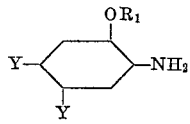

in which $R_1$ stands for a methyl or ethyl group, and one of Y stands for a group represented by $-SO_2CH_2CH_2OH$ and another Y stands for a hydrogen atom, methyl, methoxy or ethoxy group, in the form of its acid sulfuric acid ester with 1-phenyl-3-carboxy-5-pyrazolones and their methyl or ethyl esters, in which the phenyl radical contains at least one sulfonic acid group and may further contain alkyl groups and/or halogen atoms, or after contacting the aforesaid amine with the said 1-phenyl-3-carboxy-5-pyrazolone derivatives, esterifying the dyes derived with sulfuric acid at the hydroxy group of the β-hydroxyethyl group.

The dyes of the present invention represented by the above general formula are suitable for dyeing the fibre, especially for those made from natural or regenerated cellulose materials such as cotton, linen, viscose, and polyvinyl alcohol materials and yield clear reddish yellow dyeings.

The dyeing in accordance with the present invention is effected, as in the ordinary fibre reactive dyes, in the presence of acid binding agents by the methods such as impregnation, printing and padding. It is also possible by fixing the dyes with the acid binding agents after the printing or padding without any fixing agents.

The dyeings obtained in accordance with the present invention are distinguished by a brilliant reddish yellow tint and good fastnesses to light and wet processing, moreover, the dyes of the present invention are especially distinguished by a good solubility in water and a good stability of the alkaline paste for printing.

The following examples illustrate the invention, the parts being by weight, and are not intended to limit the invention.

EXAMPLE 1

27.8 parts of 2-methoxyaniline-5-β-hydroxyethyl-sulfone is added into 70 parts of sulfuric acid of 100% strength at 20° C. to 30° C. After complete dissolution the mixture is stirred for 1 hour and then introduced into 300 parts of ice and water. The precipitated sulfuric acid ester is filtered. The obtained ester is introduced into 350 parts of ice and water and diazotized with 16 parts of hydrochloric acid and aqueous 8.3 parts of sodium nitrite.

34.2 parts of 1-(4'-sulfophenyl)-3-carboxy-5-pyrazolone are dissolved neutral in 300 parts of water and 15 parts of sodium carbonate, and into this solution the foresaid diazo mixture is introduced dropwise, during then about 10 parts of sodium bicarbonate is added to maintain the reaction within pH 6–7. After the reaction is over, 160 parts of sodium chloride are added thereto and the precipitated dyes are filtered and dried at 70° C.

Thus 56 parts of the dyes represented by the following formula are obtained.

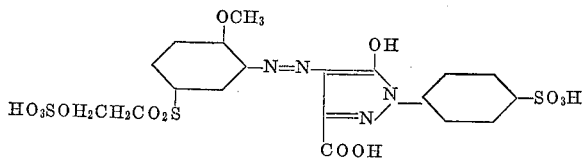

The dye obtained is an orange yellow powder which easily dissolves in water and gives reddish yellow dyeings of good fastnesses to wet processing and light and of a high brilliancy on natural or regenerated cellulose fibres with the aid of acid binding agents through the usual dyeing method of the fibre reactive dyes.

EXAMPLE 2

7 parts of 2-methoxyaniline-5-β-hydroxyethylsulfone is added into 70 parts of ice and water containing 5.5 parts of hydrochloric acid, and are diazotized with 2.8 parts of sodium nitrite.

11.4 parts of 1-(4'-sulfophenyl)-3 - carboxy - 5-pyrazolone is dissolved in 100 parts of water and 8 parts of sodium carbonate and into this solution the aforesaid diazo mixture is introduced dropwise. After the coupling reaction is over, 20 parts of sodium chloride are added and the precipitated dyes are filtered, dried and pulverized.

The dye obtained is added into 70 parts of sulfuric acid of 98% strength at 20° C. After complete dissolution, the mixture is stirred for 2 hours and then introduced into 200 parts of ice and water. 20 parts of potassium chloride is added and the precipitated dye is filtered. The cake obtained is dissolved in 150 parts of ice and water and the mixture is adjusted to pH 6–7 with aqueous potassium carbonate. The mixture is salted out with 15 parts of potassium chloride and the precipitated dyes are filtered and dried at 70° C.

Thus 18 parts of the dyes same as in Example 1 are obtained.

EXAMPLE 3

36.8 parts of 2-methoxy-5-methylaniline-4-β-hydroxyethylsulfone is added into 70 parts of sulfuric acid of 98% strength at 15°–30° C. After complete dissolution the mixture is stirred for 2 hours and then introduced into 300 parts of ice and water. The precipitated sulfuric acid ester is filtered. The obtained ester is introduced into 350 parts of ice and water and diazotized with 16 parts of hydrochloric acid and aqueous 8.3 parts of sodium nitrite.

34.2 parts of 1-(4′-sulfophenyl)-3-carboxy-5-pyrazolone is dissolved neutral in 300 parts of water and 10.2 parts of sodium bicarbonate, and into this solution the foresaid diazo mixture is introduced dropwise, during then about 20 parts of sodium carbonate is added to maintain the reaction within pH 6–7. After the reaction is over, 160 parts of potassium chloride is added and the precipitated dyes are filtered and dried at 70° C.

Thus 65 parts of the dyes represented by the following formula are obtained.

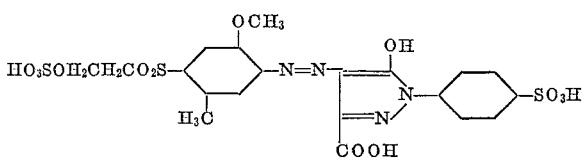

The dye obtained is an orange yellow powder which easily dissolves in water and gives reddish yellow dyeings of good fastnesses to wet processing and light and of high brilliancy on natural or regenerated cellulose fibres with the aid of acid binding agents through the usual dyeing method of the fibre reactive dyes.

EXAMPLE 4

10.8 parts of 2-methoxy-5-methylaniline-4-β-hydroxyethylsulfone is added into 100 parts of ice and water containing 5.5 parts of hydrochloric acid, and are diazotized with 2.8 parts of sodium nitrite.

11.4 parts of 1-(4′-sulfophenyl)-3-carboxy-5-pyrazolone are added into 100 parts of water and 8 parts of sodium carbonate, and into this solution the foresaid diazo mixture is introduced dropwise. After the coupling reaction is over, 25 parts of potassium chloride are added and the precipitated dye is filtered, dried and pulverized.

The dye obtained is added into 100 parts of sulfuric acid of 100% strength at 20° C. After complete dissolution, the mixture is stirred for 2 hours and then introduced into 200 parts of ice and water, and neutralized to pH 6–7 with potassium carbonate. 15 parts of potassium chloride is added thereto and the precipitated dye is filtered and dried at 70° C.

Thus 19 parts of the dye same to Example 3 is obtained.

EXAMPLE 5

In a similar way as in Examples 1 to 4, each dyes of the structures shown in the column I in the following table are obtained and give dyeings of good fastnesses to light and wet processing and of distinguished brilliancy in tint indicated in the column II.

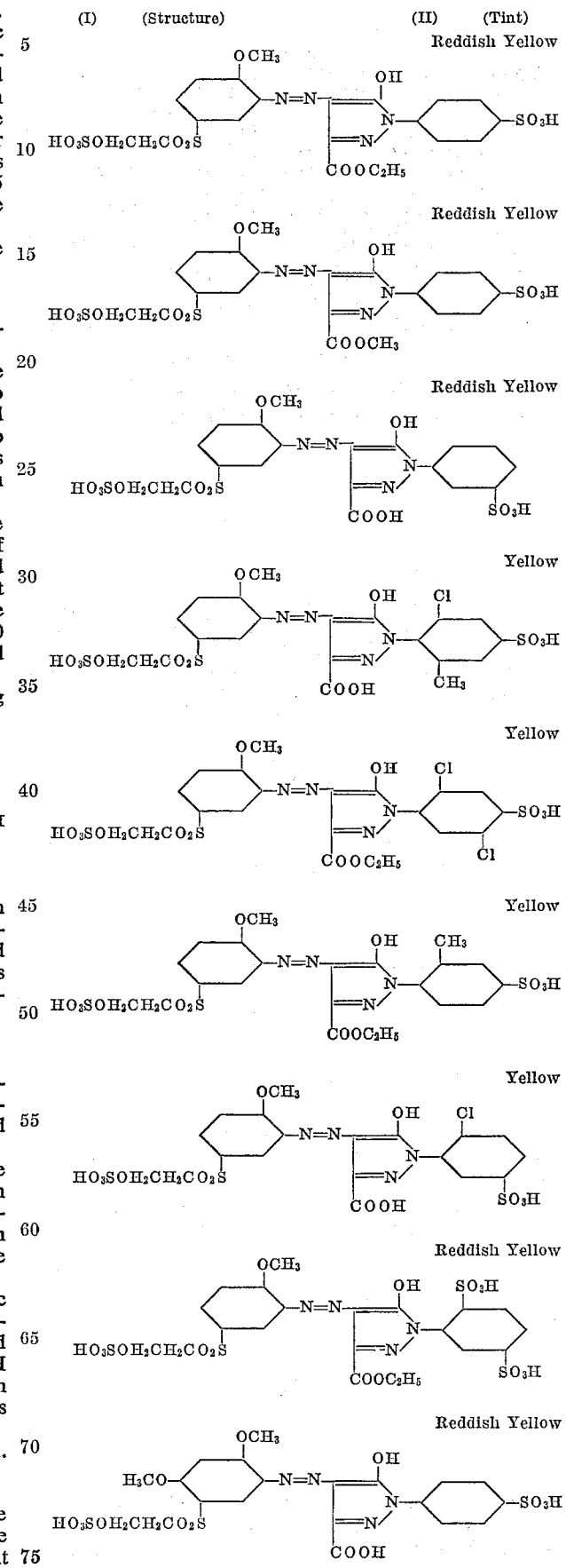

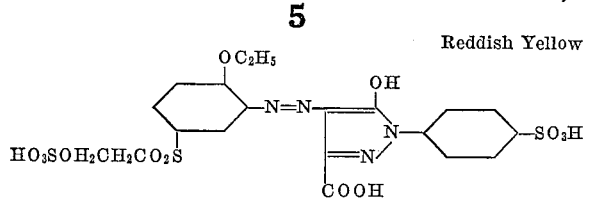 Reddish Yellow

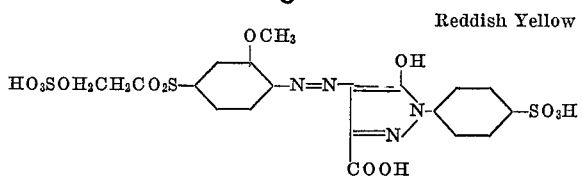 Reddish Yellow

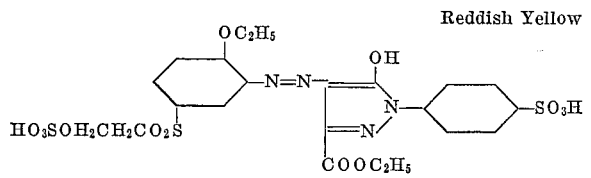 Reddish Yellow

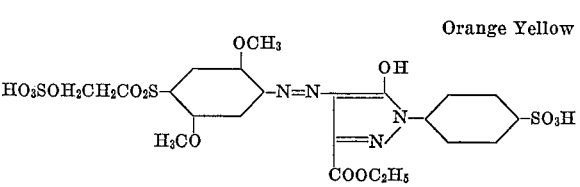 Orange Yellow

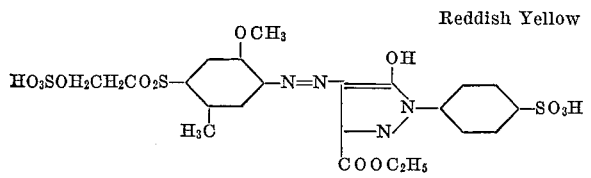 Reddish Yellow

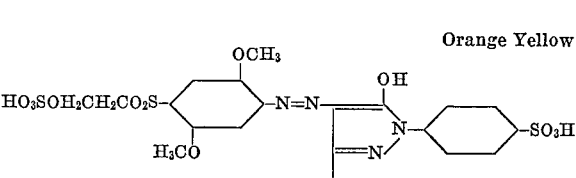 Orange Yellow

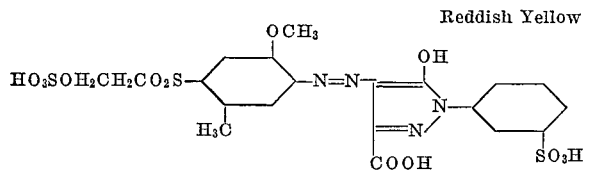 Reddish Yellow

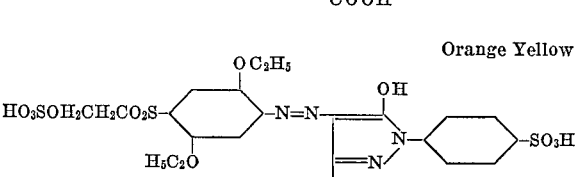 Orange Yellow

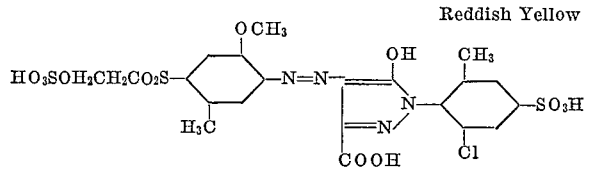 Reddish Yellow

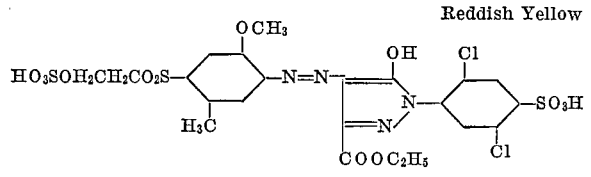 Reddish Yellow

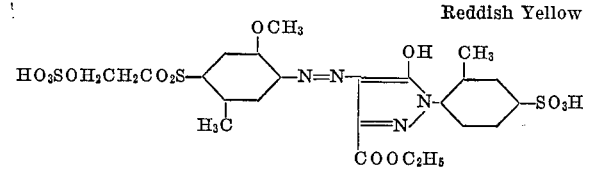 Reddish Yellow

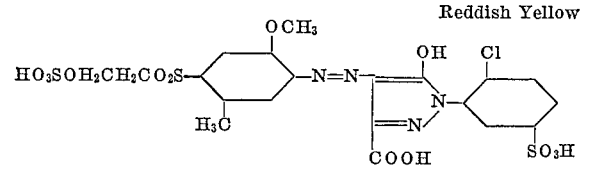 Reddish Yellow

What we claim is:

1. A monoazo dye represented by the following formula:

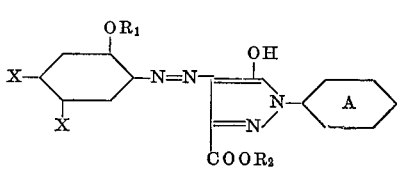

wherein $R_1$ stands for methyl or ethyl, and $R_2$ stands for hydrogen, methyl or ethyl, and one of X stands for $-SO_2CH_2CH_2OSO_3H$ and another X stands for hydrogen, methyl, methoxy or ethoxy, and the ring A stands for sulfophenyl or sulfophenyl substituted with methyl, chlorine or methyl and chlorine.

2. A monoazo dye represented by the following formula:

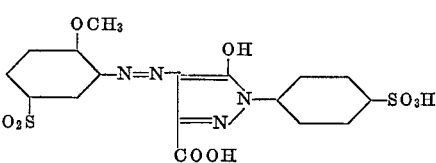

3. A monoazo dye represented by the following formula:

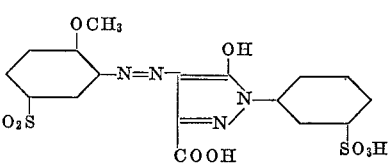

4. A monoazo dye represented by the following formula:

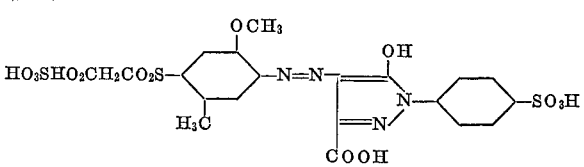

5. A monoazo dye represented by the following formula:

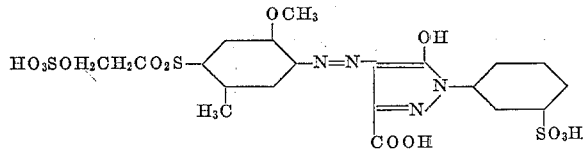

6. A monoazo dye represented by the following formula:

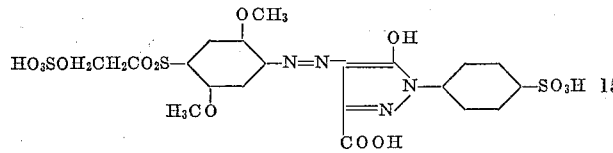

7. A monoazo dye represented by the following formula:

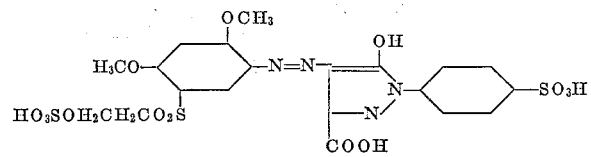

8. A monoazo dye represented by the following formula:

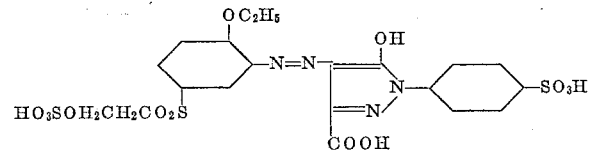

9. A monoazo dye represented by the following formula:

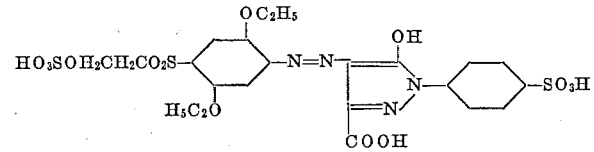

10. A monoazo dye represented by the following formula:

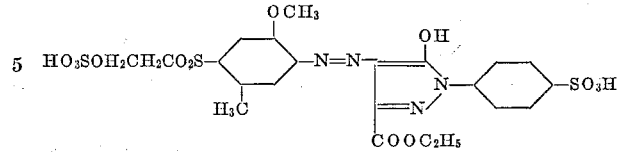

11. A monoazo dye represented by the following formula:

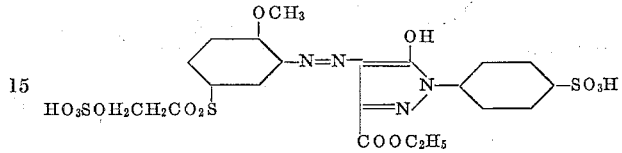

12. A monoazo dye represented by the following formula:

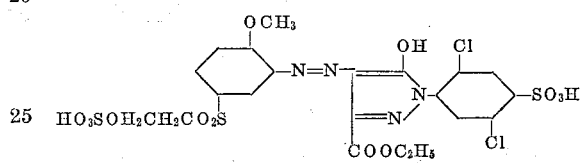

References Cited
UNITED STATES PATENTS

| | | | |
|---|---|---|---|
| 2,195,390 | 3/1940 | Ellis et al. | 260—163 |
| 2,670,265 | 2/1954 | Heyna et al. | 260—163 XR |
| 2,728,762 | 12/1955 | Heyna et al. | 260—163 |
| 2,842,537 | 7/1958 | Strobel et al. | 260—163 |
| 3,170,912 | 2/1965 | Freyermuth et al. | 260—163 |
| 3,234,207 | 2/1966 | Berner et al. | 260—163 XR |
| 3,379,715 | 4/1968 | Chiddix et al. | 260—163 |
| 3,385,843 | 5/1968 | Remy et al. | 260—163 |

FLOYD D. HIGEL, Primary Examiner

U.S. Cl. X.R.

8—41, 50, 51, 63, 71; 260—575, 310, 458